(12) United States Patent
Kee et al.

(10) Patent No.: US 11,395,108 B2
(45) Date of Patent: Jul. 19, 2022

(54) METHOD FOR CONTROLLING A VIRTUAL TALK GROUP MEMBER TO PERFORM AN ASSIGNMENT

(71) Applicant: MOTOROLA SOLUTIONS, INC, Chicago, IL (US)

(72) Inventors: Chew Yee Kee, Alor Setar (MY); Bing Qin Lim, Jelutong (MY); Guo Dong Gan, Kuala Lumpur (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/642,491

(22) PCT Filed: Oct. 23, 2018

(86) PCT No.: PCT/US2018/056978
§ 371 (c)(1),
(2) Date: Feb. 27, 2020

(87) PCT Pub. No.: WO2019/099155
PCT Pub. Date: May 23, 2019

(65) Prior Publication Data
US 2021/0329419 A1    Oct. 21, 2021

(51) Int. Cl.
*H04W 4/08* (2009.01)
*H04W 4/10* (2009.01)
(Continued)

(52) U.S. Cl.
CPC ............... *H04W 4/08* (2013.01); *G10L 13/00* (2013.01); *G10L 13/02* (2013.01); *H04M 3/562* (2013.01); *H04W 4/10* (2013.01)

(58) Field of Classification Search
CPC ......... H04W 4/08; H04W 4/10; H04M 3/562; G10L 13/00; G10L 13/02
See application file for complete search history.

(56) References Cited

U.S. PATENT DOCUMENTS 6,466,654 B1    10/2002  Cooper et al.
6,477,387 B1 *  11/2002  Jackson ................ H04W 84/08
                                                                455/518

(Continued)

FOREIGN PATENT DOCUMENTS

| EP | 2690847 A1 | 1/2014 |
| WO | 2011151502 A1 | 12/2011 |
| WO | 2015030796 A1 | 3/2015 |

OTHER PUBLICATIONS

Qing Li et al.: "CA-P2P: Context-Aware Proximity-Based Peer-to-Peer Wireless Communications", IEEE Communications Magazine, Jun. 2014, all pages.

(Continued)

*Primary Examiner* — Raymond S Dean
(74) *Attorney, Agent, or Firm* — Raguraman Kumaresan

(57) ABSTRACT

A method of operating a talk group server to control a virtual talk group member. During operation, the talk group server determines an assignment for a virtual talk group member to join a first talk group and communicate on behalf of a talk group member associated with a second talk group. The talk group server obtains user profile associated with the talk group member and causes the virtual talk group member to join the first talk group using the user profile associated with the talk group member. The talk group server then controls the virtual talk group member to perform the assignment by generating audio communications as a function of the user profile associated with the talk group member and transmitting audio communications on the first talk group.

20 Claims, 9 Drawing Sheets

(51) Int. Cl.
*H04M 3/56* (2006.01)
*G10L 13/00* (2006.01)
*G10L 13/02* (2013.01)

(56) References Cited

U.S. PATENT DOCUMENTS

| | | |
|---|---|---|
| 7,844,460 B2 | 11/2010 | Charlier et al. |
| 8,166,173 B2 | 4/2012 | Low et al. |
| 8,370,155 B2 | 2/2013 | Byrd et al. |
| 8,700,008 B2 | 4/2014 | Reddy et al. |
| 8,837,906 B2 | 9/2014 | May et al. |
| 9,288,035 B2 | 3/2016 | Johnson et al. |
| 9,998,895 B1* | 6/2018 | Schuler ............ H04W 4/90 |
| 2002/0037735 A1 | 3/2002 | Maggenti et al. |
| 2002/0102999 A1 | 8/2002 | Maggenti et al. |
| 2003/0017836 A1 | 1/2003 | Mshwanathan et al. |
| 2003/0083086 A1* | 5/2003 | Toyryla ............ H04W 4/08 |
| | | 455/518 |
| 2003/0153343 A1 | 8/2003 | Crockett et al. |
| 2003/0154249 A1 | 8/2003 | Crockett et al. |
| 2003/0231639 A1 | 12/2003 | Mikkola |
| 2005/0197146 A1 | 9/2005 | Rao et al. |
| 2005/0202836 A1 | 9/2005 | Schaedler et al. |
| 2005/0260988 A1 | 11/2005 | Kauppinen |
| 2006/0161394 A1 | 7/2006 | Dulbergdulberg et al. |
| 2006/0270362 A1 | 11/2006 | Emrich et al. |
| 2007/0015534 A1 | 1/2007 | Shimizu |
| 2007/0021136 A1 | 1/2007 | Allen et al. |
| 2007/0065357 A1 | 3/2007 | Chien |
| 2007/0155346 A1 | 7/2007 | Mijatovic et al. |
| 2007/0239824 A1 | 10/2007 | Shaffer et al. |
| 2007/0274460 A1 | 11/2007 | Shaffer et al. |
| 2007/0280195 A1* | 12/2007 | Shaffer ............ H04M 3/42221 |
| | | 370/351 |
| 2008/0147392 A1* | 6/2008 | Shaffer ............ G10L 21/0208 |
| | | 381/94.1 |
| 2008/0159177 A1 | 7/2008 | Balachandran et al. |
| 2008/0200162 A1 | 8/2008 | Chowdhury et al. |
| 2008/0207167 A1 | 8/2008 | Bugenhagen |
| 2008/0233944 A1 | 9/2008 | Tu |
| 2009/0098898 A1 | 4/2009 | Patterson |
| 2010/0056194 A1 | 3/2010 | Sen et al. |
| 2010/0087142 A1 | 4/2010 | Panpaliya et al. |
| 2010/0087199 A1 | 4/2010 | Chowdhary et al. |
| 2010/0216553 A1 | 8/2010 | Chudley |
| 2011/0143651 A1 | 1/2011 | Reider et al. |
| 2011/0044226 A1 | 2/2011 | Song et al. |
| 2011/0161399 A1 | 6/2011 | Agulnik et al. |
| 2011/0199915 A1 | 8/2011 | Santhanam et al. |
| 2011/0231353 A1 | 9/2011 | Wang et al. |
| 2012/0244812 A1 | 9/2012 | Rosener |
| 2013/0021965 A1 | 1/2013 | Chu et al. |
| 2013/0029714 A1* | 1/2013 | Koren ............ H04W 4/10 |
| | | 455/518 |
| 2013/0109425 A1 | 5/2013 | Kerger et al. |
| 2013/0157708 A1 | 6/2013 | Economy et al. |
| 2014/0074483 A1 | 3/2014 | van Os |
| 2014/0358549 A1 | 12/2014 | O'Connor et al. |
| 2014/0358964 A1 | 12/2014 | Woods et al. |
| 2014/0370895 A1 | 12/2014 | Pandey et al. |
| 2015/0072716 A1 | 3/2015 | Klein |
| 2015/0113105 A1 | 4/2015 | Ackley et al. |
| 2015/0169287 A1 | 6/2015 | Ghandour |
| 2015/0172875 A1* | 6/2015 | Lin ............ H04W 4/08 |
| | | 455/518 |
| 2015/0173106 A1 | 6/2015 | Newberg et al. |
| 2015/0186156 A1 | 7/2015 | Brown et al. |
| 2015/0193792 A1 | 7/2015 | Patel |
| 2015/0236843 A1 | 8/2015 | Johnson et al. |
| 2016/0044064 A1 | 2/2016 | Pison et al. |
| 2016/0063893 A1 | 3/2016 | Kanuganti et al. |
| 2016/0135229 A1 | 5/2016 | Swierczynski et al. |
| 2016/0135230 A1 | 5/2016 | Swierczynski et al. |
| 2016/0170710 A1 | 6/2016 | Kim et al. |
| 2016/0173644 A1 | 6/2016 | Goel et al. |
| 2016/0179787 A1 | 6/2016 | Deleeuw |
| 2016/0205517 A1 | 7/2016 | Luo et al. |
| 2016/0227384 A1* | 8/2016 | Mazzarella ............ H04W 4/10 |
| 2016/0337291 A1 | 11/2016 | Park et al. |
| 2017/0004324 A1 | 1/2017 | Seo et al. |
| 2017/0026318 A1 | 1/2017 | Daniel et al. |
| 2017/0140068 A1 | 5/2017 | Oh et al. |
| 2017/0147919 A1 | 5/2017 | Lee et al. |
| 2017/0193084 A1 | 7/2017 | Ghafourifar et al. |

OTHER PUBLICATIONS

Lewis, Grace et al.: "A Reference Architecture for Group-Context-Aware Mobile Applications", Chapter Mobile Computing, Applications, and Services, vol. 110 of the series Lecture Notes of the Institute for Computer Sciences, Social Informatics and Telecommunications Engineering pp. 44-63.
Wave 5000 Data Sheet, Motorola Solutions, Inc., 2016, all pages.
The International Search Report and the Written Opinion corresponding patent application No. PCT/US2018/056978 filed Oct. 23, 2018, dated Dec. 19, 2018, all pages.

\* cited by examiner

METHOD FOR CONTROLLING A VIRTUAL TALK GROUP MEMBER TO PERFORM AN ASSIGNMENT

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
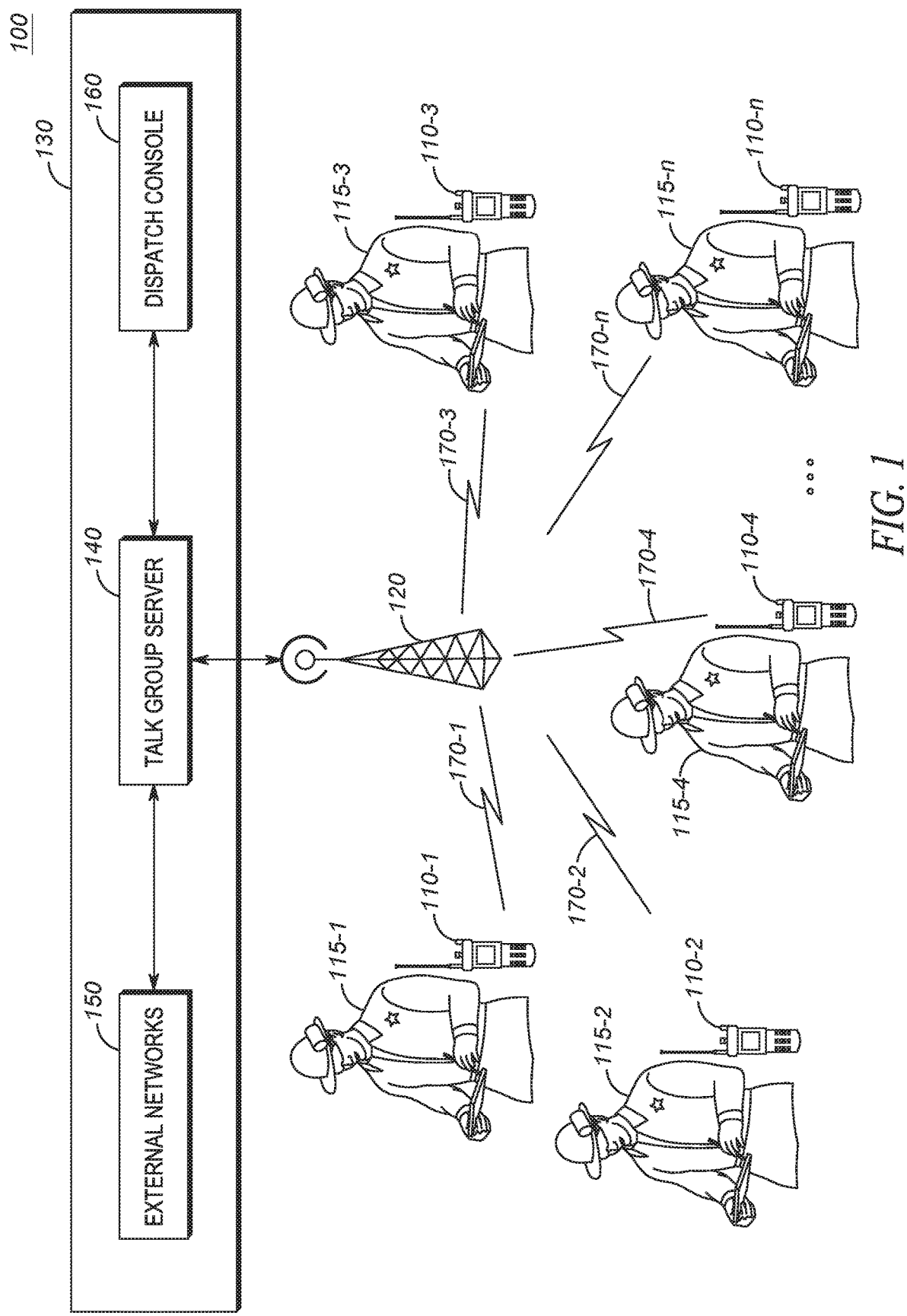
FIG. 1 is a block diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public safety communication systems, communication devices are often affiliated to different communication groups (also referred to as talk groups) to perform group communication. Group communication functionality allows a communication device (also referred to as a talk group member) to simultaneously communicate with multiple other devices that are associated with the same communication group. This avoids the need for communication devices to repeat the same message or establish different communication sessions to communicate the same message to other devices. In communication devices such as land mobile radios, a push to talk (PTT) interface is implemented to allow a user of the radio to press the push to talk interface to transmit audio on one or more communication channels (which may include a talk group channel or a private channel) for reception by multiple users associated with the talk group or for reception by a single user, respectively.

During public safety operations, users often switch between two or more talk groups to transmit and/or listen to communications transmitted on the talk groups. While it is possible for users to monitor multiple talk groups using multiple radios where each radio is affiliated to one of the talk groups, it may not be convenient for users to manually switch between different radios to transmit and/or listen to the communications. Monitoring communications via multiple radios at the same time may also further limit the attention/focus of the users.

Electronic digital assistants (also sometimes referred to as "Virtual Partners") are implemented in public safety communication systems to automatically switch a user from one talk group to another talk group. Switching the user to another talk group may be performed based on an explicit request by the user via an input (for example, such as a parsed natural language input or an electronic touch interface manipulation associated with the explicit request) in which the electronic digital assistant may reactively switch the user to another talk group, or may be based on some other set of one or more context or triggers in which the electronic digital assistant may proactively switch the user to another talk group absent any explicit request from the user.

When the user switches to a new talk group, user may miss out the conversations in the original talk group in which the user was communicating prior to the switching. In such cases, in accordance with some embodiments of the present disclosure, electronic digital assistants may be added to the original talk group as a 'virtual talk group member' to monitor group audio communications exchanged between members of the original talk group as well as provide audio responses to members in the original talk group when a talk group member poses a question in the original talk group. When an electronic digital assistant acting as a 'virtual talk group member' is added to a talk group to monitor the talk group on behalf of a talk group member, other talk group members in the talk group may be confused as to who the 'virtual talk group member' is representing unless the electronic digital assistant provides an indication of the talk group member it is representing. Further, users tend to converse differently to someone with unknown identity than someone they know personally. For example, when the electronic digital assistant poses a question to the talk group, other talk group members may not know the identity of the talk group member that the electronic digital assistant is representing. Therefore it is possible that the response provided by another talk group member in the group may not be completely relevant to the question (or response) posed by the 'virtual talk group member' unless the electronic digital assistant identifies the talk group member it is representing, every time it poses (or responds to) a question to the talk group.

Disclosed is an improved method for controlling a virtual talk group member to perform an assignment. The virtual talk group member (for example, implemented as an electronic digital assistant) performs an assignment, for example, by communicating in a given talk group on behalf of a talk group member using the user profile of the talk group member, where the talk group member may be currently associated or actively communicating in a different talk group when the virtual talk group member performs the assignment in the given talk group.

One embodiment provides a method of operating a talk group server for controlling a virtual talk group member. The method includes determining, at an electronic processor, an assignment for a virtual talk group member to join a second talk group and communicate on behalf of a talk group member associated with a first talk group; obtaining, at the electronic processor, user profile associated with the talk group member; joining, at the electronic processor, the virtual talk group member to the second talk group using the user profile associated with the talk group member; and controlling, at the electronic processor, the virtual talk group member to generate audio communications as a function of the user profile associated with the talk group member and transmit audio communications on the second talk group.

Another embodiment provides a talk group server that includes an electronic processor and a communication interface communicatively coupled to the electronic processor. The electronic processor is configured to determine an assignment for a virtual talk group member to join a first talk group and communicate on behalf of a talk group member associated with a second talk group, obtain user profile associated with the talk group member, cause the virtual talk group member to join the first talk group using the user profile associated with the talk group member, and control the virtual talk group member to perform the assignment by generating audio communications as a function of the user profile associated with the talk group member and transmitting audio communications on the first talk group.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

Referring now to the drawings, and in particular FIG. 1, a communication system 100 is shown including a plurality of communication devices 110-1 through 110-n, a base station 120, and an infrastructure radio access network (RAN) 130. The plurality of communication devices 110-1 through 110-n can be interchangeably referred to, collectively, as communication devices 110, and generically as a communication device 110. The communication device 110 may be associated with or subscribed to one or more talk groups to perform group communication. The communication devices 110-1 through 110-n may be operated by respective users 115-1 through 115-n (for example, a first responder), generically referred to as user(s) 115. The users 115 may carry or wear the respective communication devices, such as a battery-powered portable radio used for narrowband and/or broadband direct-mode or infrastructure communications, a battery-powered radio speaker microphone (RSM) video capture device, a laptop having an integrated video camera and used for data applications such as incident support applications, smart glasses which may be virtual reality, augmented reality, or mixed reality glasses, wearable communication devices, mobile phones, and vehicular radios. Each communication device 110 may include one or more wireless communication interfaces for communicating with a base station 120 and/or directly with one or more other communication devices 110 in the system 100.

The base station 120 and infrastructure RAN 130 works in tandem to provide infrastructure wireless communication services to served communication devices 110 that are within a wireless transmission range of the base station 120. While infrastructure RAN 130 is illustrated in FIG. 1 as including a talk group server 140, external networks 150, and a dispatch console 160, in other embodiments, RAN infrastructures may contain a subset of such components or may contain a superset of such components. For example, infrastructure RAN 130 may include one or more elements such as additional base stations, base station controllers, router, switches, gateways, and the like, arranged, connected, and programmed to provide wireless service to communication devices 110. The communication system 100 could take the form of a public-safety radio network or commercial broadband network.

The talk group server 140 may be, for example, a radio controller, PTT server, zone controller, mobile management entity (MME), base station controller (BSC), mobile switching center, site controller, call controller, or other network device. While the talk group server 140 is illustrated as a separate entity in the system 100, the talk group server 140 may be integrated with other devices (such as a zone controller) in the infrastructure RAN 130 and/or within BS 120. The talk group server 140 may be configured to provide registration, authentication, encryption, routing, and/or other services to communication devices 110 operating within the coverage area of the base station 120, in addition to further features and functions disclosed herein. The talk group server 140 may additionally track or have access to group subscription information that, for each group identifier associated with a particular group of communication devices 110 (e.g., talk group), identifies communication devices 110 (e.g., by a device identifier (ID) such as a hardware ID, hardware Media Access Control (MAC) address, Internet Protocol (IP) address, radio ID, International Mobile Subscriber Identity (IMSI), a serial number, or some other unique identifier that can be used to identify subscribed member communication devices) that are members of the particular group of communication devices 110.

The communication device 110 that is a member of a particular talk group may be referred herein as a 'talk group member' and an electronic digital assistant or electronic module that is added to a particular talk group to monitor communications in the talk group on behalf of a talk group member may be referred herein as a 'virtual talk group member'. While the term "talk group" is used in this description, it will be understood by those of skill in the art that a term such as "communication group" could be used instead, and that the media data being exchanged among the members of the group could be any suitable type of data, such as voice data, image data, video data, and the like. Further, the term "talk group" is used in this disclosure to refer to groups of communications devices as well as virtual talk group members created and/or maintained in the infrastructure RAN 130.

External networks 150 may be made accessible to communication devices 110 via infrastructure RAN 130. External networks 150 may include, for example, a public switched telephone network (PSTN), a plain old telephone (POT) system, a wide-area packet-switched network such as the Internet, or another wired or wireless service provider's network, among other possibilities.

Dispatch console 160 may be directly coupled to the talk group server 140, as shown, or may be indirectly coupled to talk group server 140 via one or more internal or externals networks. The dispatch console 160 allows an administrator or dispatcher at a dispatch console to initiate infrastructure-sourced group communications to groups of communication devices 110, among other features and functions. In accordance with some embodiments, the dispatch console 160 may also be added to one or more talk groups as a member of the talk groups, to transmit and/or listen to communications on the talk groups. In accordance with some embodiments, the virtual talk group member can also be created in one or more talk groups to represent the dispatch console 160.

Infrastructure RAN 130 and base station 120 may implement one or more radio access technologies (RATs) and may communicate with communication devices 110 over respective air-interface links 170-1 through 170-n (collectively referred to as air-interface link or links 170) according to the one or more RATs. Example RATs include a direct-mode, conventional, or infrastructure-mode trunked land-mobile-radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RATs operate in accordance with standard and/or protocols such as Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoW), an LTE Direct or LTE Device to Device, or a PTT over IP (PoIP) application. While FIG. 1 illustrates an example in which all communication devices 110 use a same RAT, in other embodiments, each communication device or set of communication devices may use different RATs to communicate with one or more same or different infrastructure RAN.

Downlink communications over air-interfaces 170 may be addressed to communication devices 110 (e.g., multicast or broadcast using an identifier, such as a Subscriber Group ID (SGID), that is associated with a group of communication devices), and/or to one or more single communication devices (e.g., unicast using an identifier, such as a Subscriber Unit Identifier (SUID), that is uniquely associated with that communication device), among other possibilities that are known to those of skill in the art.

In addition to infrastructure wireless air-interface links 170 communicatively coupling the communication devices 110 to the infrastructure RAN 130 via the base station 120, communication devices may also maintain ad-hoc or direct-mode ("ad-hoc") air-interface links without any intervening infrastructure between them. For example, the communication device 110-1 may be wirelessly coupled to communication device 110-2 via a direct-mode air interface link (not shown) in accordance with one or more direct-mode air-interface protocols, such as Bluetooth, near field communication (NFC), Infrared Data Association (IrDA), ZigBee, direct-mode land-mobile-radio (LMR), and/or Wi-Fi, as long as the devices are within mutual transmission range of one another.

Figure 2:
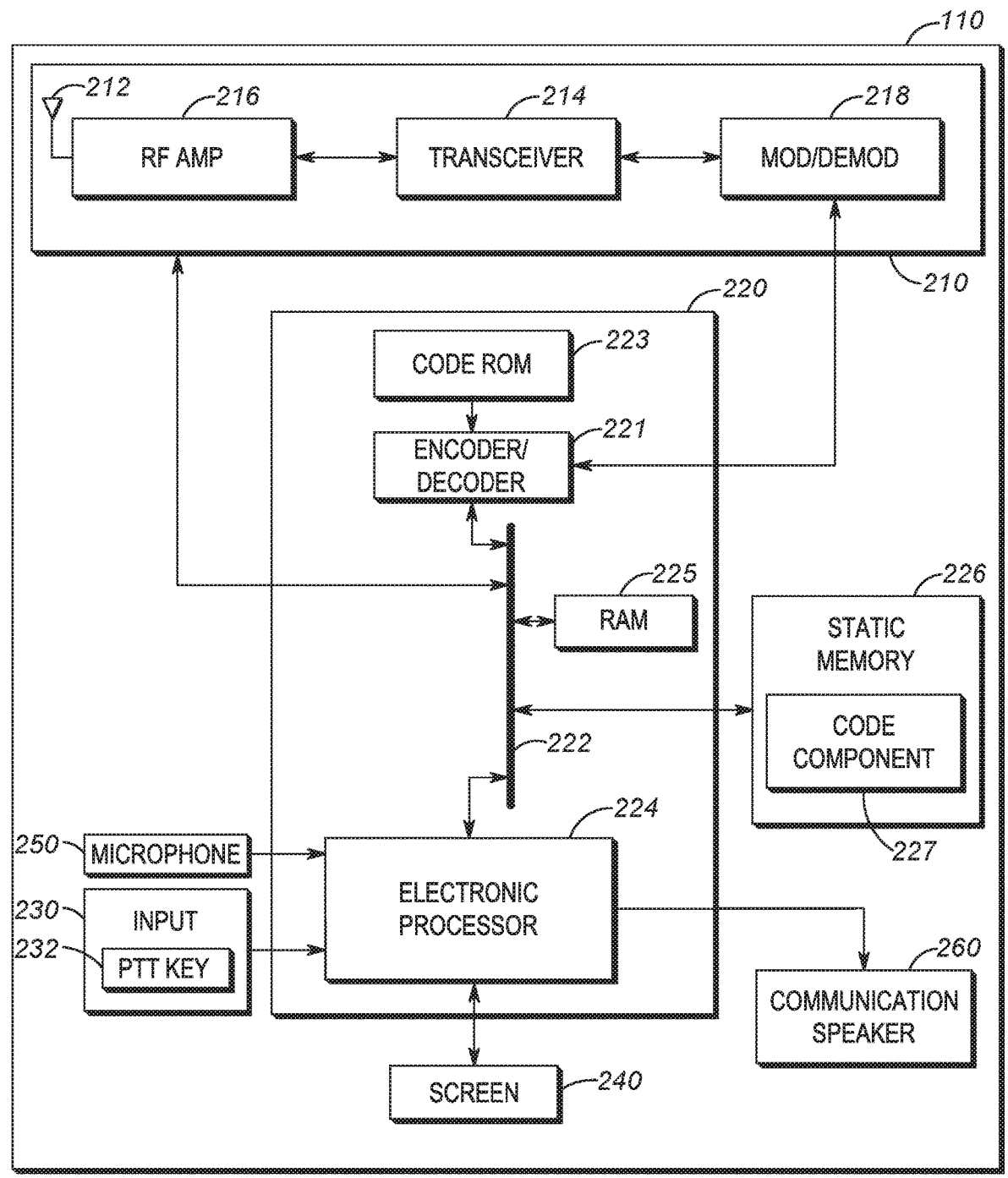
FIG. 2 is a block diagram of a communication device, in accordance with some embodiments.

FIG. 2 is an example functional block diagram of a communication device 110 operating within the communication system 100 in accordance with some embodiments. As shown in FIG. 2, the communication device 110 comprises a radio frequency communications unit 210 coupled to a common data and address bus 222 of a processing unit 220. The communication device 110 may also include an input 230 and a display screen 240, each coupled to be in communication with processing unit 220. The input 230 may include an alphanumeric physical keypad (or virtual keypad in cooperation with capacitive touch display screen 240) for inputting text for group communications. The display screen 240 may further function to display group communications received via communications unit 210. A microphone 250 captures audio from a user that is further vocoded by processing unit 220 and transmitted as voice data by communication unit 210 to other communication devices 110 or other devices in system 100. A communications speaker 260 reproduces audio that is decoded from voice data transmissions received from other communication devices via the communications unit 210.

The processing unit 220 may also include an encoder/decoder 221 with an associated code Read Only Memory (ROM) 223 for storing data for initializing system components and encoding and/or decoding voice or other traffic information (including image data, audio data, video data, text data, control signals, etc.) that may be transmitted or received by the communication device 110. The processing unit 220 may further include a electronic processor 224 coupled, by the common data and address bus 222, to the encoder/decoder 221, a RAM 225, and a static memory 226.

The radio frequency communications unit 210 is a combined receiver and transmitter (e.g., transceiver) having a common antenna 212. The radio frequency communications unit 210 has a transceiver 214 coupled to the antenna 212 via a radio frequency amplifier 216. The transceiver 214 may be a transceiver operating in accordance with one or more standard protocols, such as a DMR transceiver, a P25 transceiver, a TETRA transceiver, a Bluetooth transceiver, an LTE transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless network. The transceiver 214 is also coupled to a combined modulator/demodulator 218 that is coupled to the encoder/decoder 221.

The electronic processor 224 has ports for coupling to the input 230 and to the display screen 240. The electronic processor 224 further has ports for coupling to the microphone 250 and to the speaker 260. In some embodiments of the present disclosure, the static memory 226 may store operating code 227 for the electronic processor 224 that, when executed by the electronic processor 224, perform one or more of the operations set forth in FIGS. 4-9 and accompanying text. Static memory 226 may comprise, for example, a HDD, an optical disk drives such as a CD drive or DVD drive, a SSD, a tape drive, a flash memory drive, or a tape drive, to name a few.

The input 230 may include a push-to-talk (PTT) key 232 that functions to activate a transmit function in a half or full-duplex communication device, transitioning the communication device (when activated) from a listen-only mode to a transmit-only mode (for half-duplex communication devices) or transmit and receive mode (for full-duplex communication devices). The PTT key 232 may be a hard mechanical switch set under spring pressure and operated by a finger or hand pressure of a user, or may be a contact switch that is operated by a presence of a grounding element such as a user's finger or hand over or on a surface of the contact switch. In other embodiments, the PTT key 232 may be a soft-switch that is programmed to act as a PTT key at all times or only during certain situations, and may take the form of a geometric shape on a touch-sensitive screen labeled with its function or some other input key or button. Other possibilities exist as well.

Figure 3:
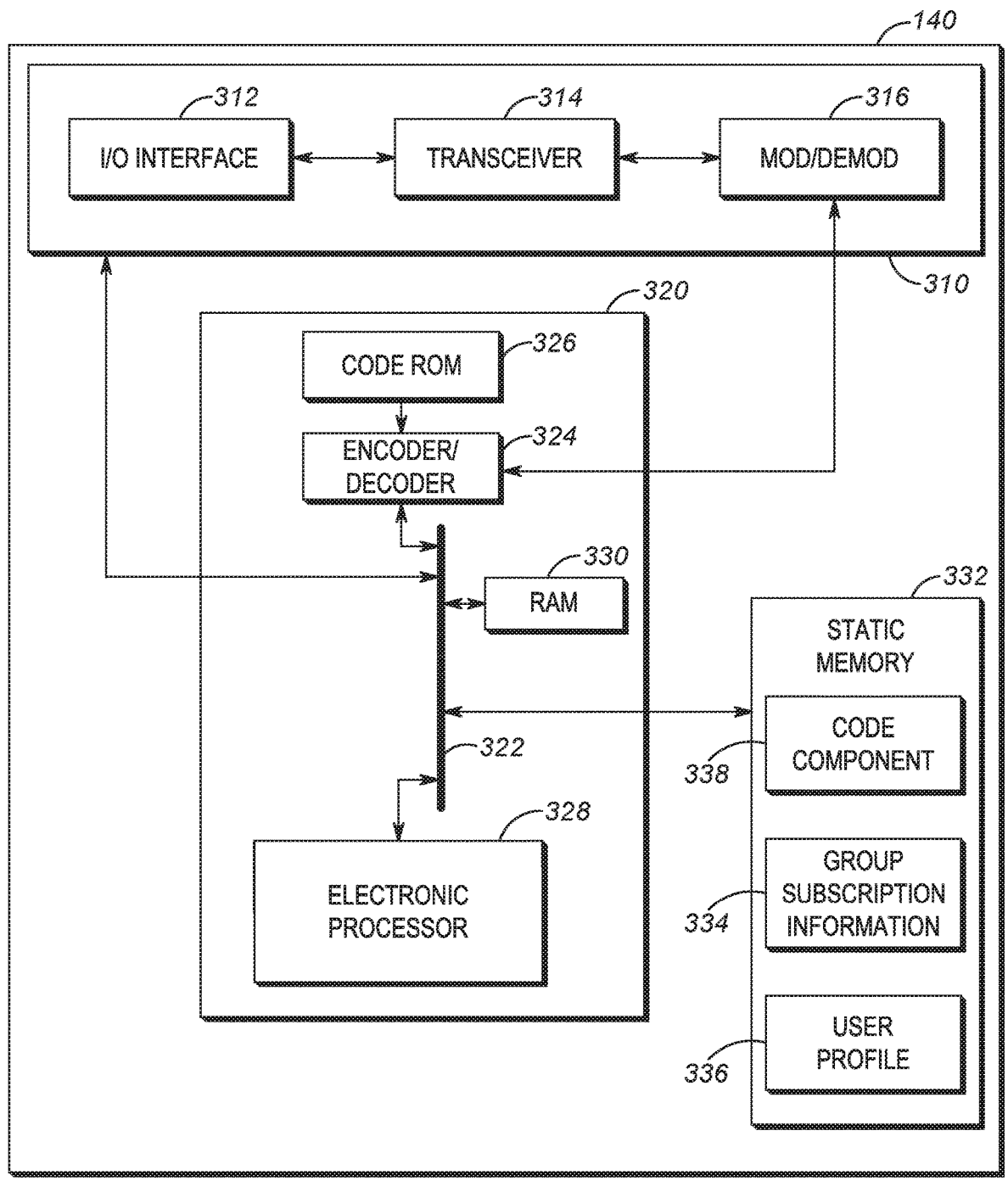
FIG. 3 is a block diagram of a talk group server, in accordance with some embodiments.

FIG. 3 is an example functional block diagram of a talk group server 140 that operates within the communication system 100 to control a virtual talk group member to perform an assignment in accordance with some embodiments. While FIG. 3 represents the talk group server 140 described above with respect to FIG. 1, depending on the type of the server, the talk group server 140 may include fewer or additional components in configurations different from that illustrated in FIG. 3. As shown in FIG. 3, the talk group server 140 includes a communications unit 310 that is coupled to a common data and address bus 322 of the processing unit 320.

The communications unit 310 may include one or more wired or wireless input/output (I/O) interfaces 312 that are configurable to communicate with communication devices 110, base station 120, and/or with other devices in or communicably coupled to the system 100. The communications unit 310 may include one or more wireless transceivers 314, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless radio network. The communications unit 310 may additionally include one or more wireline transceivers 314, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 314 is also coupled to a combined modulator/demodulator 316 that is coupled to an encoder/decoder 324 of the processing unit 320.

The processing unit 320 may include the encoder/decoder 324 with an associated code Read Only Memory (ROM) 326 for storing data for initializing system components, and encoding and/or decoding voice, data, control, or other signals that may be transmitted or received between the talk group server 140 and communication devices 110 in the system 100. The processing unit 320 may further include a electronic processor 328 coupled, by the common data and address bus 322, to the encoder/decoder 324, a Random Access Memory (RAM) 330, and a static memory 332.

Static memory 332 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Static memory 332 may store (or talk group server 140 may have access to, via communications unit 310) permanently or temporarily, group subscription information 334 that, for each group identifier associated with a particular group of communication devices, identifies communication devices 110 that are members of the particular group. Additionally or alternatively, static memory 332 may also store (or talk group server 140 may have access to, via communications unit 310), user profile 336 corresponding to each communication device 110 that is a member of a talk group managed by the talk group server 140. The user profile 336 for each talk group member includes information related to one or more of device identifier corresponding to the talk group member, talk group identifier with which the talk group member is currently associated, one or more voice characteristics of the talk group member (i.e., voice characteristics of user of the communication device 110), and a determined context corresponding to the talk group members. The determined context may include information identifying an incident (e.g., an event, type, and location of the incident assigned to a first responder) associated with the talk group member, an agency (e.g., fire fighter or police department) to which the talk group member is affiliated, rank, experience, and role of the talk group member, historical talk group conversations (i.e., recorded conversations) associated with the talk group member, knowledge data (e.g., skill level and knowledge level of the user) of the talk group member, and sensor data (e.g., such as an indication of a gun being removed from holster, heart rate of the user, ambient audio data, environmental data etc.) corresponding to the talk group member.

Static memory 332 may further store operating code 338 for the electronic processor 328 that, when executed, performs one or more of the functions set forth in FIGS. 4-9 and accompanying text. For example, the electronic processor 328 of the talk group server 140 determines an assignment for a virtual talk group member and uses the user profile 336 of a given talk group user or member (also referred to as original talk group member) to create a virtual talk group member and further cause the virtual talk group member to join to a talk group (also referred to as a target talk group or a destination talk group), such that the virtual talk group member can communicate on behalf of the original talk group member in the target talk group, even while the original talk group member is associated or actively communicating on another talk group. The electronic processor 328 also controls the virtual talk group member to generate audio communications as a function of the user profile 336 associated with the original talk group member. For example, the electronic processor 328 may control the virtual talk group member to synthesize voice that is similar to the original talk group member using the voice characteristics of the original talk group member and transmit audio communications using the synthesized voice on the target talk group. In another example, the electronic processor 328 may control the virtual talk group member to generate content for audio communications based on historical talk group conversations (e.g., based on data content previously sent or received by the original talk group member in the associated talk groups). Similarly, the electronic processor 328 may use other data such as skill and knowledge level in the user profile of a talk group member to identify data content (for example, extracted from the historical conversations or data stored in one or more databases in the system 100) that is likely to be spoken by the original talk group member in a given context or situation during group communication. Then the electronic processor 328 uses such determined data content to generate audio communications to be transmitted by the virtual talk group member on the target talk group on behalf of the original talk group member.

The virtual talk group member may be implemented via an electronic digital assistant that may be executed on one or more computing devices (not shown) in the system 100. In some embodiments, an individual component and/or a combination of individual components of the system 100 may be referred to as an electronic computing device that implements an electronic digital assistant as mentioned above. For example, the talk group server 140 illustrated in FIG. 1, or a component in external networks (such as back-end infrastructure device or combination of back-end infrastructure devices existing on-premises or in a remote cloud computing cluster accessible via the infrastructure RAN 130), may additionally or alternatively operate as a back-end electronic digital assistant consistent with the remainder of this disclosure.

For example, the electronic computing device may be a single electronic processor (for example, electronic processor 224 of the communication device 110 shown in FIG. 2 or electronic processor 328 of the talk group server 140 shown in FIG. 3). In other embodiments, the electronic computing device includes multiple electronic processors distributed remotely from each other. For example, the electronic computing device may be implemented on a combination of at least two of the electronic processor 328 of the talk group server 140, the electronic processor 224 of the communication device 110, and an electronic processor (not shown) of a back-end device such as in a cloud computing cluster (not shown) in the system 100.

Figure 4:
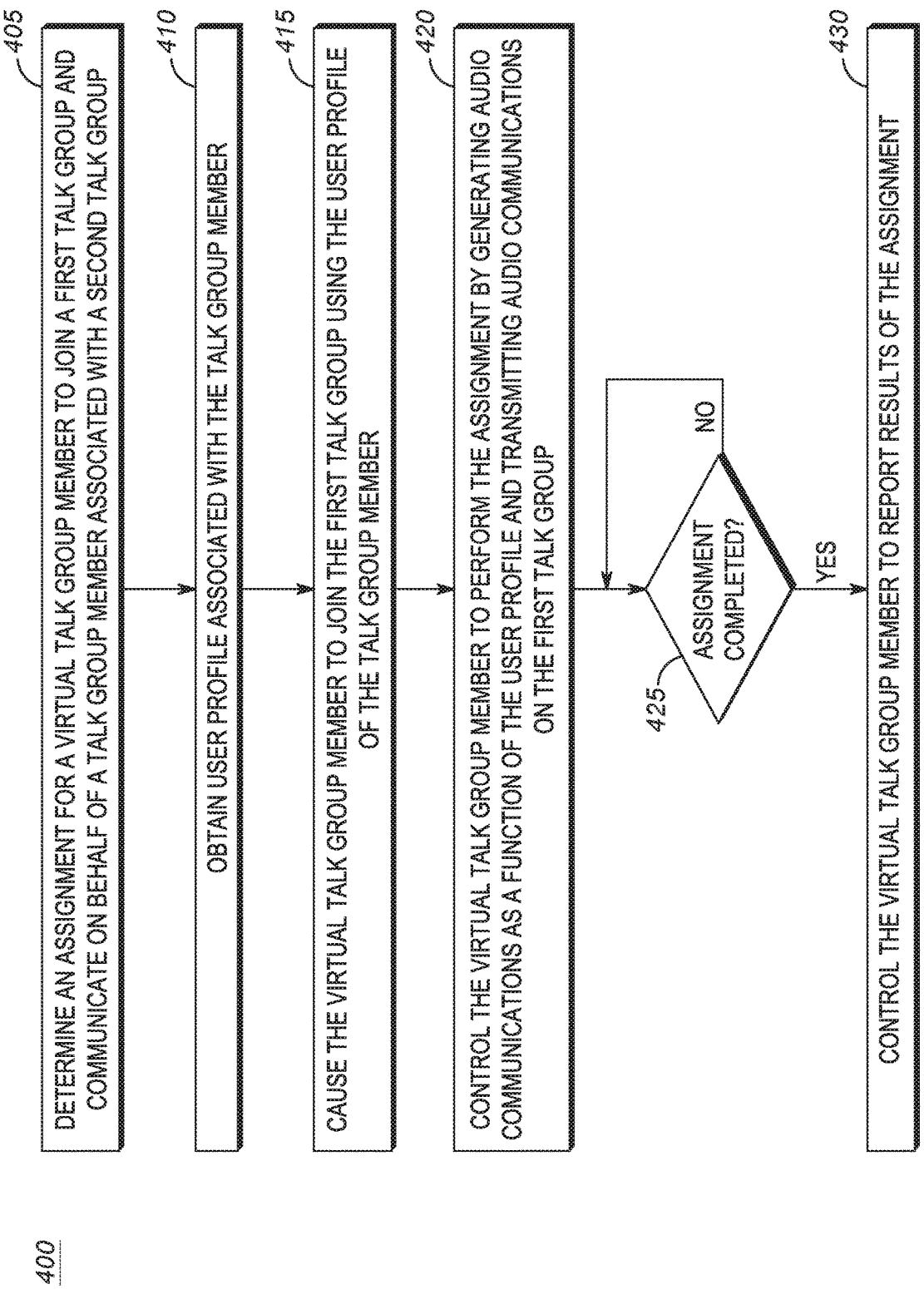
FIG. 4 illustrates a flow chart of a method for controlling a virtual talk group member to perform an assignment.

FIG. 4 illustrates a flow chart diagram of a method 400 performed by the talk group server 140 for controlling a virtual talk member to perform an assignment. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The method shown in FIG. 4 can be performed by one or more components, for example, electronic processor 328 of the talk group server 140, and will be described with reference to the functions and components of the system 100.

At block 405, the talk group server 140 determines an assignment for a virtual talk group member to join a first talk group (i.e., target talk group) and communicate on behalf of a talk group member associated with a second talk group. The talk group server 140 determines this assignment, for example, based on an audio inquiry received from a talk group member.

A talk group user (e.g., user 115) may, for example, provide an audio inquiry (i.e., a voice command) that is received by the microphone 250 of the communication device 110. In accordance with some embodiments, the electronic digital assistant (for example, implemented at the communication device 110 of the user 115 or at the talk group server 140 or at one or more other electronic computing devices in the system 100) receives signals representative of the audio inquiry (directly from the microphone 250 or through monitoring audio communications on a talk group channel associated with the talk group of the user 115) and analyzes the signals to identify the intent and/or content of the audio inquiry. For example, the electronic digital assistant processes the audio inquiry via a natural language processing (NLP) engine to identify the intent and/or content of the audio inquiry. In accordance with some embodiments, the electronic digital assistant identifies that the intent and/or content of the audio inquiry indicates a need to create a virtual talk group member to perform an assignment. In this case, the electronic digital assistant processes the audio inquiry to extract information related to: the talk group member for which the virtual talk group member is to be created or configured, the assignment to be completed by the virtual talk group member, and the talk group (i.e., first talk group) to which the virtual talk group member is to join to perform the assignment. As used herein, the term 'assignment' indicates one or more tasks assigned to be performed by a virtual talk group member on behalf of a given talk group member, and the tasks may include, but not limited to, one or more of: monitoring and/or recording conversations between members of a given talk group, automatically responding to questions posed by a member of the given talk group, requesting specific information and/or posing questions to members in the given talk group; and providing recorded portions of the monitored conversations (e.g., summarized conversations) to a requesting talk group member or to the given talk group member.

In one example, the audio inquiry from the user 115 may indicate that the user 115 wants to switch from a first talk group to a second talk group. The talk group server 140, in addition to switching the user 115 (i.e., corresponding talk group member/communication device 110) to the second talk group, may also determine an assignment for a virtual talk group member to join the first talk group (i.e., the talk group with which the user 115 was associated and/or communicating immediately prior to switching to the second talk group) and communicate on behalf of the user 115 in the first talk group while the user 115 is communicating in the second talk group after switching to the second talk group. In another example, the audio inquiry may be issued by a user 115 with a request to create a virtual talk group member for another user. For example, a commanding officer may issue a request to create a virtual talk group member, such that the virtual talk group member can perform an assignment in a given talk group on behalf of another user who reports to the commanding officer. In response, the talk group server 140 may determine an assignment for a virtual talk group member based on the request received from the commanding officer.

In other embodiments, the talk group server 140 may automatically determine an assignment and need to create a virtual talk group member without receiving an audio inquiry from a given talk group member. For example, the talk group server 140 may monitor whether a given talk group member has switched from a first talk group to a second talk group (for example, based on an affiliation request from the given talk group member to join to the second talk group), and may automatically determine an assignment for a virtual talk group member when the given talk group member switches from the first talk group to second talk group. In this example, the talk group server 140 may create a virtual talk group member using the user profile of the given talk group member and further control the virtual talk group member to join the given talk group member's original talk group (i.e., first talk group) after the given talk group member has switched to the second talk group.

Other possibilities to determine an assignment for a virtual talk group member exist as well, for example, when the talk group server 140 detects that the talk group member associated with the first talk group is unable to talk or listen to conversations on the first talk group due to network issues (e.g., call disconnection), ambient noise that exceeds a noise threshold near the location of the talk group member, or when the talk group member is actively responding to an incident (e.g., a fire fighter is in the process of controlling the fire).

At block 410, the talk group server 140 obtains user profile (for example, user profile 336 stored in the memory 332) associated with a talk group member (also referred herein as original talk group member) for which the virtual talk group member is to be created to perform the assignment.

At block 415, the talk group server 140 causes the virtual talk group member to join the first talk group using the user profile 336 of the talk group member. In one embodiment, the talk group server 140 registers a virtual talk group member with the first talk group using the same profile with which the talk group member was previously registered with the first talk group. The talk group server 140 further updates the group subscription information 334 in the memory 332. For example, the group identifier corresponding to the first talk group in the group subscription information 334 is updated to indicate that the virtual talk group member is now a member of the first talk group. For example, a device identifier associated with an electronic computing device (e.g., the communication device 110 or another computing device located in the system and communicatively coupled to the talk group server 140) at which the virtual talk group member is configured or implemented is added to the group subscription information 334. The talk group server 140 also configures talk group resources (e.g. communication channels) for the virtual talk group member (i.e., the corresponding electronic computing device) to allow the virtual talk group member to transmit and/or receive audio communications in the first talk group.

At block 420, the talk group server 140 controls the virtual talk group member to perform the assignment by generating audio communications as a function of the user profile associated with the talk group member and further transmitting audio communications on the first talk group. In one embodiment, the talk group server 140 sends instructions to the virtual talk group member (i.e., the electronic computing device at which the virtual talk group member is implemented) to perform the assignment. The instructions to perform the assignment may further include a list of tasks to be performed by the virtual talk group member on the first talk group and also one or more parameters included in the user profile that needs to be applied when generating and/or transmitting audio communications on a talk group channel associated with the talk group. For example, the talk group server 140 may instruct the virtual talk group member to apply the voice characteristics of the talk group member as identified in the user profile when responding to any questions posed by other talk group members on the talk group. In accordance with some embodiments, the talk group server 140 updates the user profile 336 when there is a change in one or more parameters or context associated with the user profile 336, and further instructs the virtual talk group member to perform the assignment using the updated user profile. Further, the talk group server 140 may instruct the virtual talk group member to transmit an audio tone prior to and/or after transmitting audio communications on behalf of the talk group member on the first talk group. For example, the audio tone may indicate that a 'virtual talk group member' is responding to a question on behalf of a user. The audio tone may also indicate an identifier of the original talk group member.

In another example, the talk group server 140 instructs the virtual talk group member to generate content for audio communications based on historical talk group conversations (e.g., based on data content previously sent or received by the talk group member in the associated talk groups). Similarly, the talk group server 140 instructs the virtual talk group member to apply skill and knowledge level (as included in the user profile 336) of the talk group member to identify data content (for example, extracted from the historical conversations or data stored in one or more databases in the system 100) used for generating audio communications for transmission on the first talk group. This allows the virtual talk group member to use data content that is likely be used by the original talk group member when responding to a question in a given context or situation during group communication in the first talk group. In accordance with some embodiments, the virtual talk group member performs the assignment in the first talk group at the same time the original talk group member is actively transmitting and/or receiving audio communications (using the same user profile) on a different talk group (i.e., second talk group).

Next, at block 425, the talk group server 140 determines whether the assignment is completed. For example, if the assignment is for the virtual talk group member to monitor conversations in the first talk group while the original talk group member is currently associated with the second talk group, the talk group server 140 detects that the assignment is completed when the original talk group member switches back from the second talk group to the first talk group. In another example, if the assignment is to collect some information from one or more members in the first talk group even while the original talk group member is communicating on another talk group, the talk group server 140 detects that the assignment is completed when the virtual talk group member collects the information from the first talk group (for example, by posing a question to members of the first talk group and receiving a response from one or more members including the information to be collected) and reports that the information is collected. In other embodiments, the virtual talk group member determines the completion of the assignment and informs the talk group server 140.

If the talk group server 140 determines the assignment is not completed, the talk group server 140 continues to control the virtual talk group member to perform the assignment. Otherwise, if the talk group server 140 determines that the assignment is completed, the talk group server 140 controls the virtual talk group member to report the results of the assignment as shown in block 430. For example, if the assignment is related to monitoring conversations in the first talk group while the original talk group member is associated with the second talk group, the talk group server 140 instructs the virtual talk member to provide a copy of the monitored conversations (e.g., a report including summary of the monitored conversations) to the talk group member when the talk group member disassociates from the second talk group or alternatively switches back to the first talk group. In some embodiment, the virtual talk group member may report only portions of monitored conversations that are of high priority to the user. In another example, if the assignment is to collect some information from one or more members in the first talk group while the original talk group member is communicating on another talk group, the talk group server 140 instructs the virtual talk member to report the collected information to the talk group member. In these examples, the result of the assignment may be provided to the talk group member (for example, via a private call from the virtual talk group member to the talk group member) as an audio output at the communication speaker 260 of the communication device 110 or in other forms such as video, image, or text forms at the display screen 240 of the communication device 110. In some embodiments, the talk group server 140 may instruct the virtual talk group member to report the results of the assignment on a talk group channel associated with the first talk group or another talk group so that the results may be received by all members of the first talk group or another talk group. In these embodiments, if the virtual talk group member is not already associated with the talk group at which the results of the assignment needs to be reported, the talk group server 140 may control the virtual talk group member to switch from the current talk group (i.e., first talk group) to another talk group (e.g., second talk group) in order to communicate the results of the assignment on the another talk group. Further, in these embodiments, the virtual talk group member may generate audio communications including information collected as a result of the completion of the assignment and further as a function of the user profile (for example, by applying voice characteristics) associated with the original talk group member. The virtual talk group member may then transmit the audio communications including information collected as result of the assignment on the second talk group with which the original talk group member is currently associated. In other embodiments, the virtual talk group member may switch to a third talk group to report results of the assignment based on receiving an instruction from the talk group server 140 or based on a determination that the assignment itself indicates that the results are to be reported on the third talk group.

In accordance with some embodiments, the talk group server 140 may receive updates (e.g., in response to a change in the determined context) related to the user profile of a talk group member while a corresponding virtual talk group member is already performing an assignment related to a given talk group. In such cases, the talk group server 140 may also update the virtual talk group member. For example, the talk group server 140 may cause the virtual talk group member to re-register to the same talk group or to a different talk group using the updated user profile. In another example, the talk group server 140 may update the assignment to be performed by the virtual talk group member based on the updates to the user profile. In some embodiments, the update to the user profile (e.g., in response to a change in the user's incident assignment) may indicate that the assignment is no longer required to be performed. In such cases, the talk group server 140 causes the virtual talk group member to de-register or dissociate from the talk group. The talk group server 140 also updates the group subscription information 334 to remove the virtual talk group member from a list of members associated with the corresponding group identifier.

In accordance with some embodiments, a given talk group user may have multiple virtual talk group members that are created or configured by the talk group server 140. In these embodiments, each of the multiple virtual talk group members joins a different talk group and performs the assignment on the respective talk groups on behalf of the original talk group member. In some embodiments, a single virtual talk group member may switch between different talk groups to perform the assignment (e.g., to communicate with different members) on the different talk groups on behalf of the original talk group member and further reports the results of the assignment after performing the assignment in multiple talk groups.

Figure 5:
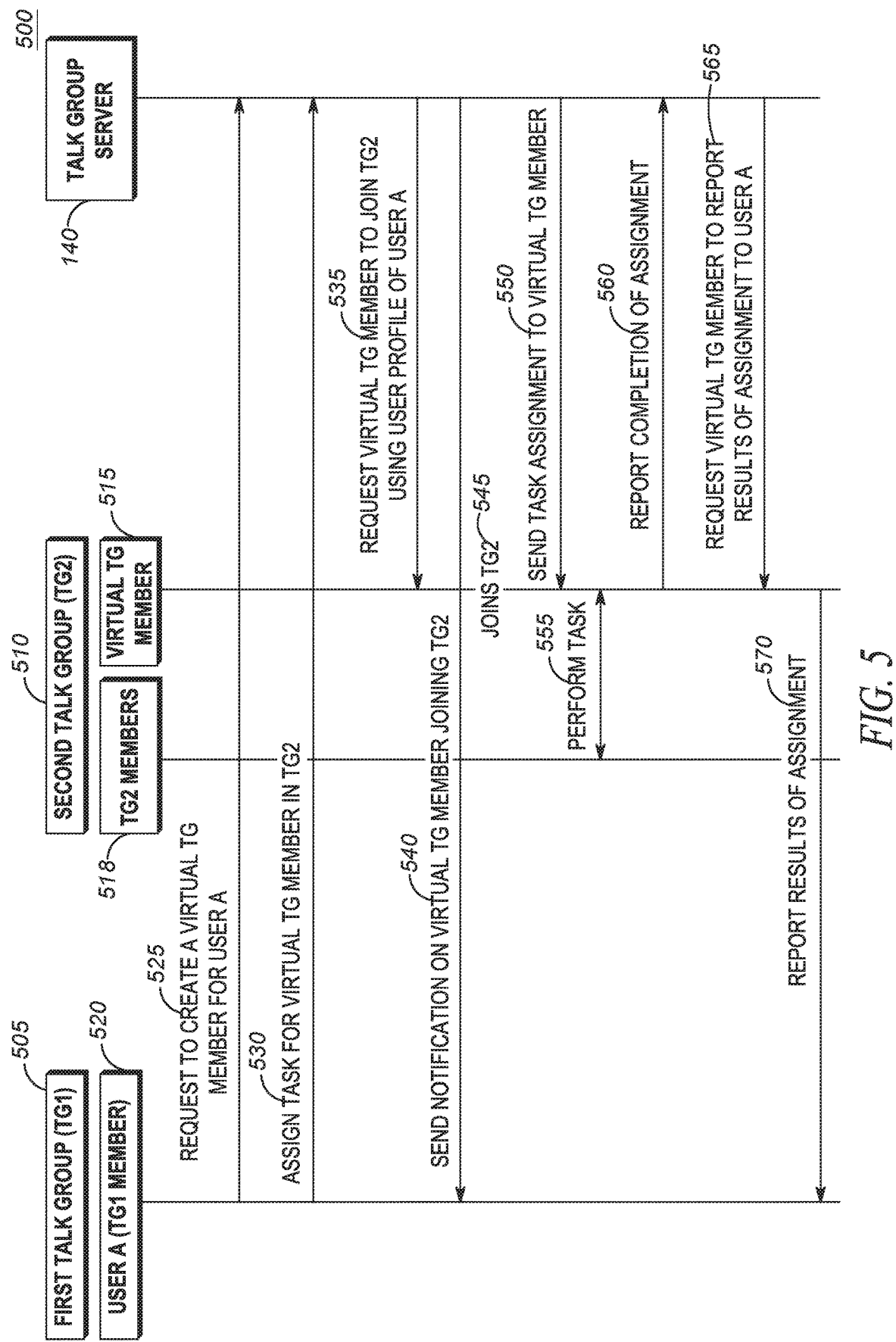
FIG. 5 illustrates a message flow diagram of a method for controlling a virtual talk group member to perform an assignment.

FIG. 5 illustrates a message flow diagram 500 of a method 400 for controlling a virtual talk group member to perform an assignment, in accordance with some embodiments. The talk group server 140 is shown controlling a first talk group (TG1) 505 and a second talk group (TG2) 510. Further, as shown in FIG. 5, a member of the first talk group 505, namely, user 'A' 520 requests 525 to create a virtual talk group member. In accordance with embodiments, the request 525 to create a virtual talk group member may be sent from one or more electronic computing devices (e.g., communication device 110 shown in FIG. 1) associated with user 'A' 520. The user 'A' also assigns 530 a task for the virtual talk group member to be performed in the second talk group 510. The request 525 may indicate the corresponding user i.e., a talk group member for which the virtual talk group member needs to be created. In one example, the user 'A' 520 may request that the virtual talk group member is to be created using a user profile of another user. In another example, as shown in FIG. 5, the user 'A' 520 may request that the virtual talk group member is to be created using a user profile of the requesting user (i.e., user 'A' 520).

The talk group server 140 creates a virtual talk group member 515 and further requests 535 the virtual talk group member to join the second talk group 510 using the user profile of user 'A' 520. In accordance with some embodiments, the talk group server 140 creates the virtual talk group member 515 by configuring one or more electronic computing devices in the system 100 to perform the role of a virtual talk group member using user profile of the user 'A' 520. The talk group server 140 also sends 540 a notification for user 'A' 520, for example, to the communication device 110 of user 'A' 520, to indicate that a virtual talk group member 515 is joining the second talk group 510 using the user profile of user 'A' 520. The virtual talk group member 515 joins 545 the second talk group 510 using the user profile of user 'A' 520. In other words, the talk group server 140 causes the virtual talk group member 515 to join the second talk group 510 by registering the virtual talk group with the second talk group and further by configuring resources to enable the virtual talk group member to communicate in the second talk group 510. The talk group server 140 also sends 550 task assignment to virtual talk group member 515. The virtual talk group member 515 performs 555 the task in the second talk group 510, for example, by monitoring conversations between members 518 of the second talk group 510, or by communicating with members 518 of the second talk group 510. The virtual talk group member 515 then reports 560 completion of the assignment to the talk group server 140. For example, if the task is to obtain some information by communicating in the second talk group 510, then the virtual talk group member 515 reports the completion of the assignment to the talk group server 140 after it has obtained the information in the second talk group 510. Next, the talk group server 140 requests 565 the virtual talk group member 515 to report the results of the assignment to user 'A' 520. The virtual talk group member 515 then reports 570 the results of the assignment to user 'A' 520, for example, via a private call with the communication device 110 of the user 'A', 520 or by switching to the first talk group 505.

Figure 6:
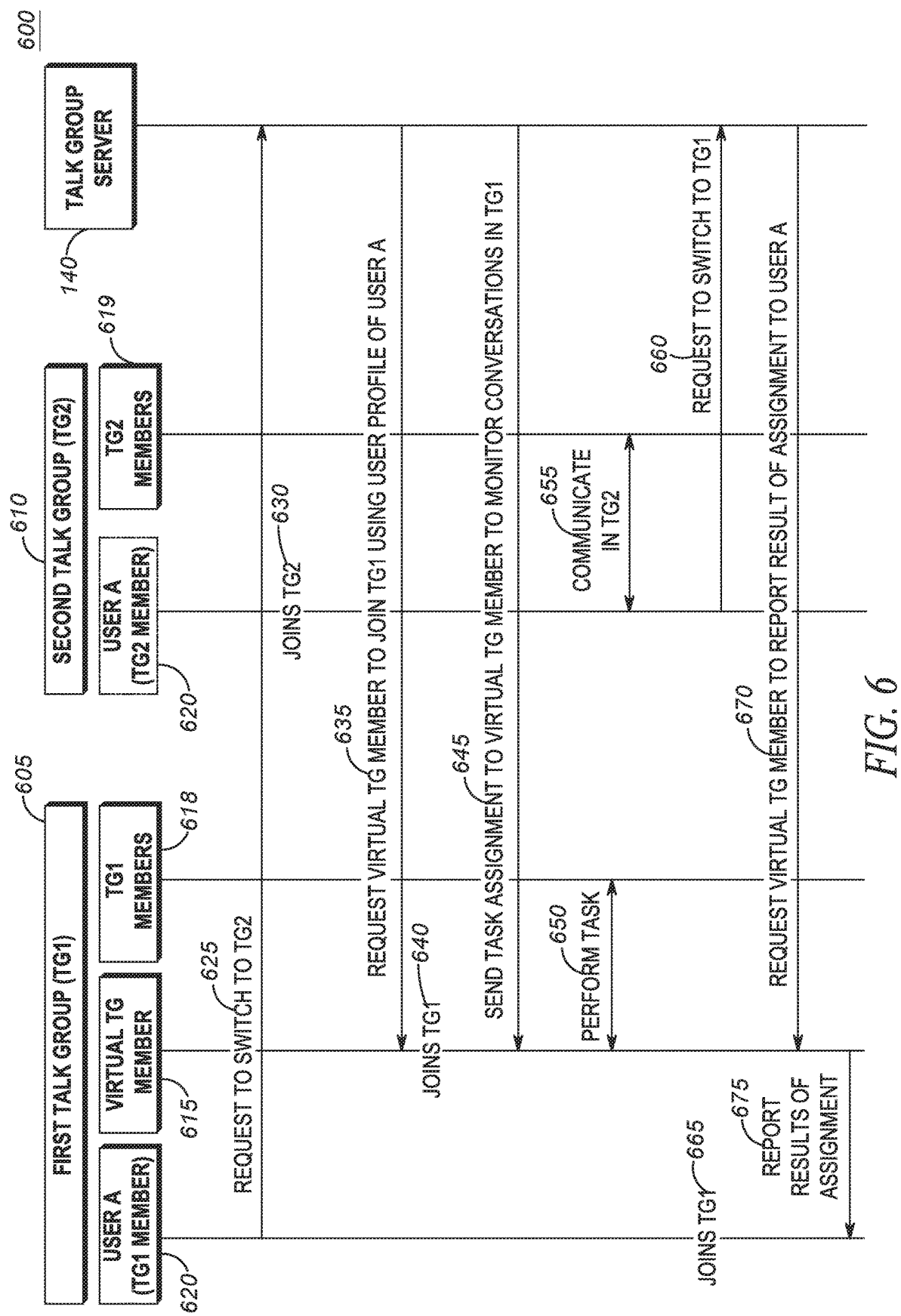
FIG. 6 illustrates a message flow diagram of a method for controlling a virtual talk group member to perform an assignment.

FIG. 6 illustrates a message flow diagram 600 of a method 400 for controlling a virtual talk group member to perform an assignment, in accordance with some embodiments. The talk group server 140 is shown controlling a first talk group (TG1) 605 and a second talk group (TG2) 610. Further, as shown in FIG. 6, a member of the first talk group 605, namely, user 'A' 620 requests 625 to switch to a second talk group 610, for example, through voice command or by turning a frequency knob of the communication device 110 to select a channel associated with the second talk group 610. Responsive to user 'A' 620 joining 630 the second talk group 610, the talk group server 140 creates a virtual talk group member 615 and further requests 635 the virtual talk group member 615 to join the first talk group 605 using the user profile of user 'A' 620. When the virtual talk group member joins 640 the first talk group 605, the talk group server 140 sends 645 task assignment to virtual talk group member 615 to monitor conversations between members 618 in the first talk group 605 while user 'A', 620 may be communicating in the second talk group 610. Next, the virtual talk group member performs 650 the task by monitoring conversations between members 618 in the first talk group 605 while the user 'A" 620 communicates 655 with members 619 in the second talk group 610. Next, the user 'A" 620 requests 660 the talk group server 140 to switch the user 'A" 620 to the first talk group 605, for example, through another voice command or by turning the frequency knob to the original frequency channel position associated with the first talk group 605. After the user 'A' 620 disassociates from the second talk group 610 and re-joins 665 the first talk group 605, the talk group server 140 requests 670 the virtual talk group member 615 to report results of assignment to user 'A" 620. The virtual talk group member 615 reports 675 the results of the assignment to user 'A' 620, for example, via a private call to a communication device 110 of user 'A' 620 or by transmitting audio communications including the results of the assignment on the first talk group 605.

Figure 7:
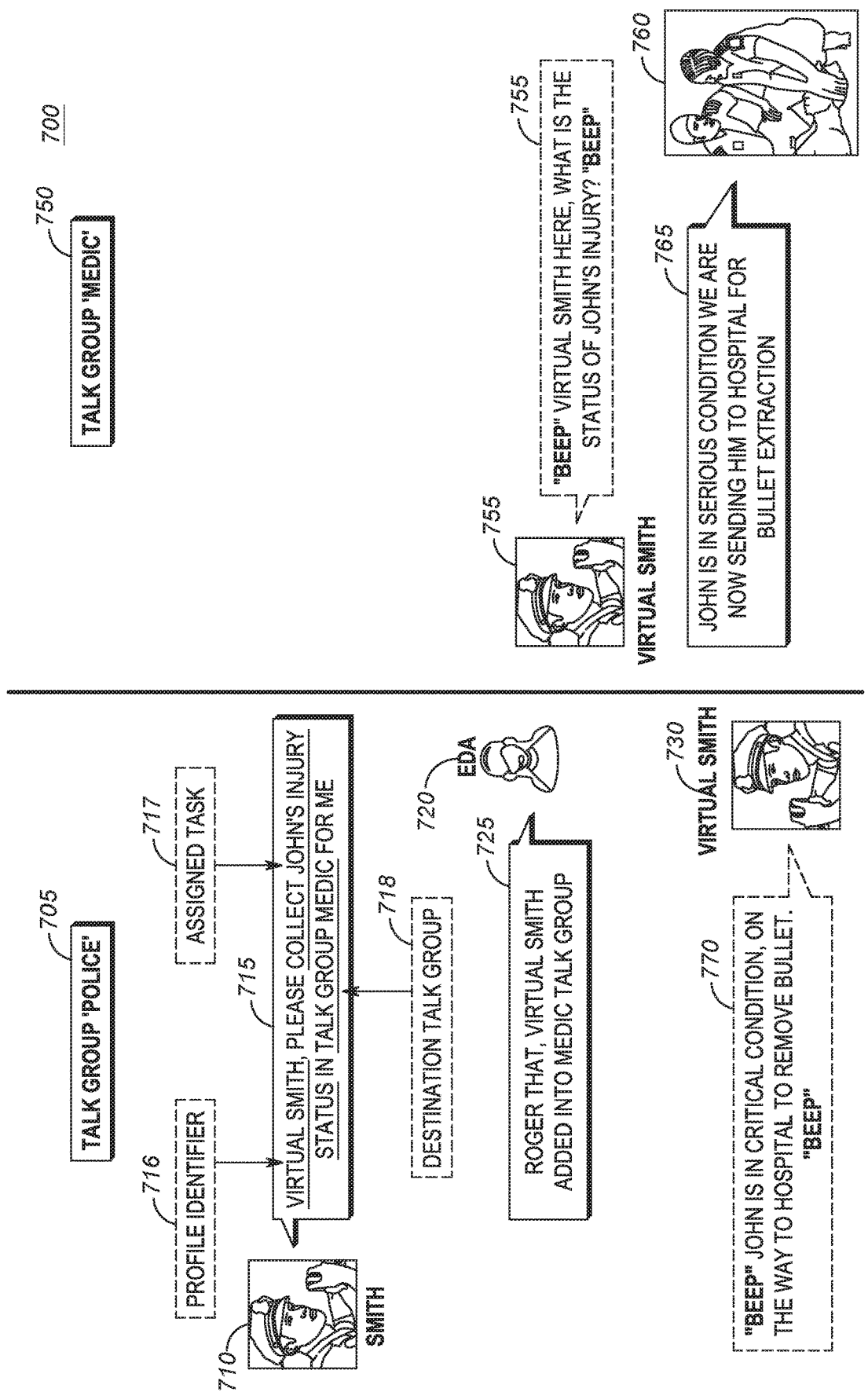
FIG. 7 illustrates an example scenario in which the method for controlling the virtual talk group member to perform an assignment is implemented.

FIG. 7 illustrates a first example scenario 700 in which the method 400 for controlling the virtual talk group member to perform an assignment can be implemented. In the example scenario 700, a user named 'Smith' 710 is shown as a member of the talk group 'Police' 705. The user 'Smith' 710 issues a voice command 715 to request to create a virtual talk group member. In accordance with some embodiments, a text command to create a virtual talk group member may also be received. In this example, the virtual talk group member is referred to as 'virtual Smith' (or 'virtual self') since the user's request is to create a virtual talk group member to perform an assignment using his own user profile i.e., of user 'Smith' 710. The voice command 715 is processed, for example, via an electronic digital assistant (EDA) 720 to identify: a profile identifier 716 which indicates that the virtual talk group member is to be created using the user profile of the requesting user i.e., user 'Smith' 710; an assigned task 717 which indicates the task to be performed by the virtual talk group member; and a destination talk group 718 which indicates a talk group to which the virtual talk group needs to join to perform the assigned task. In this example, user 'Smith' 710 requests his virtual self to collect injury status for officer 'John' from talk group members who are associated with another talk group 'Medic' 750.

In response to the voice command 715, the electronic digital assistant 720 acknowledges the voice command 715 and provides an audio confirmation 725 in the talk group 705 when the virtual talk group member, i.e., 'Virtual Smith' 730 is created and added to the destination talk group, i.e., talk group 'Medic' 750. When virtual 'Smith' 730 is added to the talk group 'Medic' 750, virtual 'Smith' 730 performs the assigned task. In this example, virtual 'Smith' 730 issues an audio inquiry 755 on the talk group 'Medic' 750 to check the injury status for officer 'John.' The audio inquiry 755 may include an audio tone (such as a 'beep') prior to and/or after transmitting message portion of the audio inquiry 755. The virtual 'Smith' 730 may or may not need to introduce itself as virtual 'Smith' since the audio inquiry is synthesized based on voice profile of user 'Smith' 710 which the members 760 of 'Medic' talkgroup 750 are already familiar with. In response, one or more talk group members 760 in the talk group 'Medic' 750 may provide an audio response 765 with the injury status for officer 'John'. Virtual 'Smith' 730 may determine that the task is completed based on the response 765 received in the talk group 'Medic' 750. Subsequently, virtual 'Smith' 730 disassociates itself from the talk group 'Medic' 750 and provides an audio response 770 identifying the injury status for officer 'John'. The audio response 770 may be provided to the user 'Smith' 710 via a private call. Alternatively, as shown in FIG. 7, the virtual talk group member 730 may switch from the talk group 'Medic' 750 to the talk group 'Police' 705 and transmit audio communications on the talk group 'Police' 705 including the audio response 770.

Figure 8:
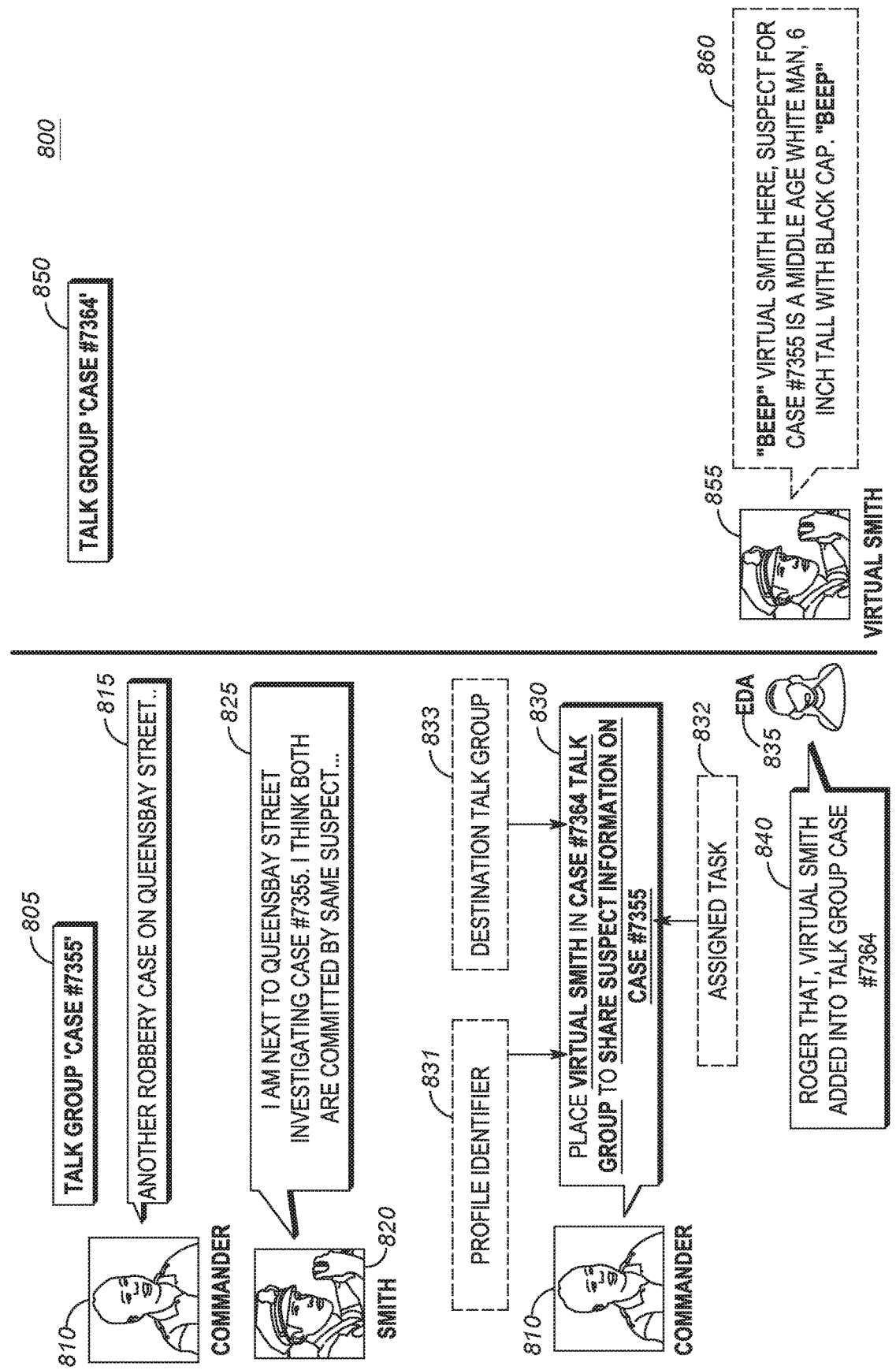
FIG. 8 illustrates a second example scenario in which the method for controlling the virtual talk group member to perform an assignment is implemented.

FIG. 8 illustrates a second example scenario 800 in which the method 400 for controlling the virtual talk group member to perform an assignment can be implemented. In the example scenario 800, a commander 810 sends an audio communication 815 to a talk group, namely 'Case #7355' 805 to inform about an incident (robbery case) in a particular location. In response, user 'Smith' 820 who is a member of the talk group 'Case #7355' 805 sends an audio communication 825 to inform the commander 810 that he is investigating another incident in the same location and further indicating that the suspect may be same in both the incidents. Based on this information that the suspect is same in both the incidents, the commander 810 may want to share this information with members in another other talk group, namely 'Case #7364' 850. However, since user 'Smith' 820 is currently busy investigating 'case #7355', the commander 810 may want to place virtual 'Smith' 855 in talk group 'Case #7364' 850 to share this information so that members in talk group 'Case #7364' 850 can readily recognize that information is received from or provided by user 'Smith'

820. Accordingly, the commander 810 issues a voice command 830 with a request to create virtual 'Smith' 855 in talk group 'Case #7364' 850 to share information about the common suspect. The voice command 830 is processed, for example, via an electronic digital assistant (EDA) 835 to identify: a profile identifier 831 which indicates that the virtual talk group member is to be created using the user profile of the user 'Smith' 820; an assigned task 832 which indicates the task to be performed by the virtual talk group member 855; and a destination talk group 833 which indicates a talk group to which the virtual talk group member needs to join to perform the assigned task.

In response to the voice command 830, the electronic digital assistant 835 acknowledges the voice command 830 and provides an audio confirmation 840 to the commander 810 to confirm that the virtual talk group member, i.e., 'Virtual Smith' 855 is created and added to the destination talk group i.e., talk group 'Case #7364' 850. When virtual 'Smith' 855 is added to the talk group 'Case #7364' 850, virtual 'Smith' 855 performs the assigned task. In this example, virtual 'Smith' 855 sends an audio communication 860 on the talk group 'Case #7364' 850 to share information about the suspect. The audio communication 860 may include an audio tone (such as a 'beep') prior to and/or after transmitting message portion of the audio communication 860. The audio communication 860 from virtual 'Smith' 855, for example, may use a voice profile based on the voice characteristics of the original user, so that other members in the talk group 'case #7364' 850 may not get confused about the source of this information, and may readily recognize that the suspect information is being provided by user 'Smith' 820. In this example, the audio communication 860 content is generated based on user profile of user 'Smith' 820, for example, the incident assignment that user 'smith' 820 is working on at the time, the conversation log of user 'Smith' 820 in a given period (e.g., last two hours), the incident report that user 'Smith' 820 has written, and the action done by user 'Smith' that is detected and logged by sensors associated with the communication device 110 of user 'Smith' 820.

Figure 9:
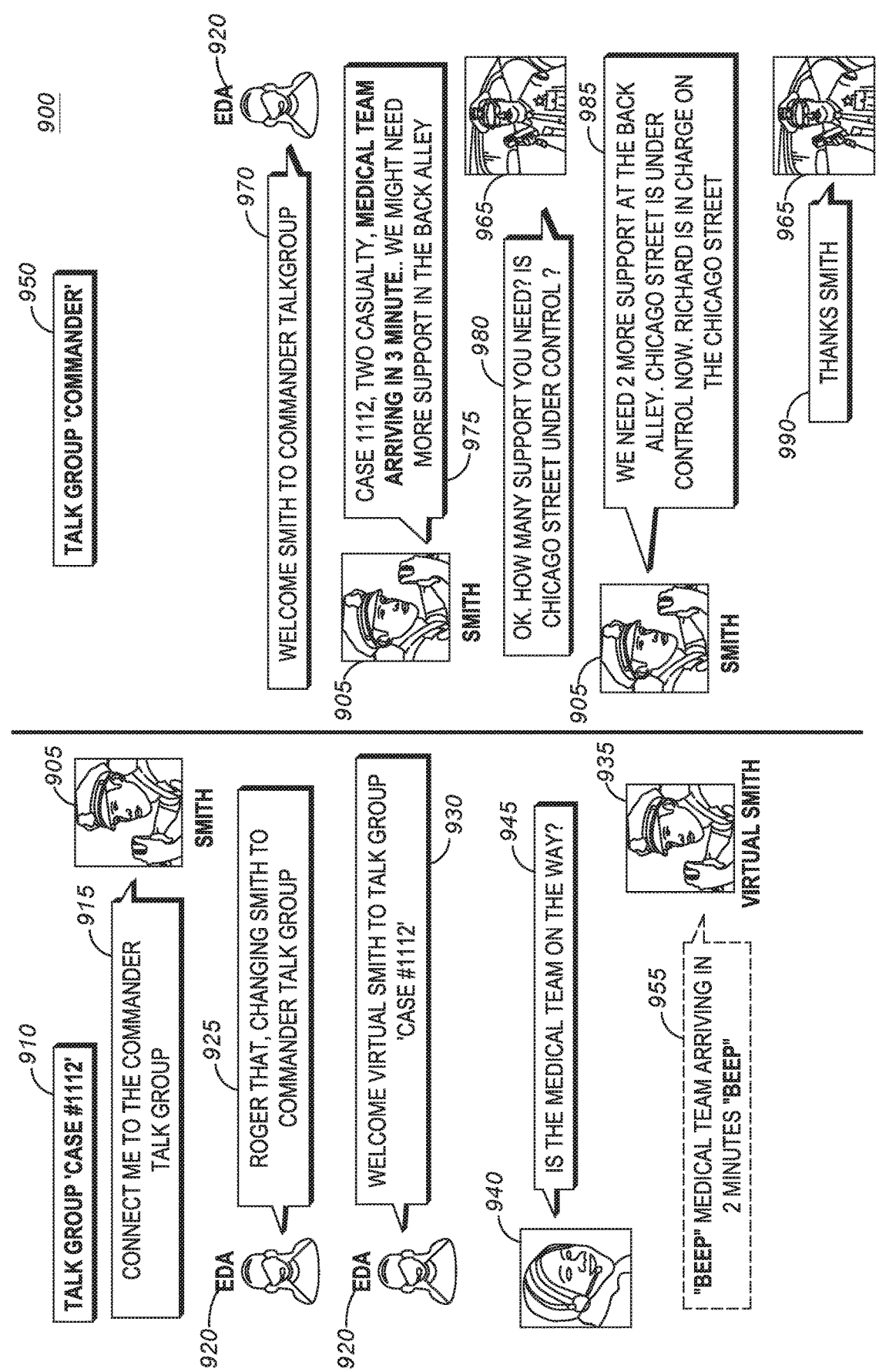
FIG. 9 illustrates a third example scenario in which the method for controlling the virtual talk group member to perform an assignment is implemented.

FIG. 9 illustrates a third example scenario 900 in which the method 400 for controlling the virtual talk group member to perform an assignment can be implemented. In the example scenario 900, a user named 'Smith' 905 is shown as a member of the talk group, namely 'Case #1112' 910. The user 'Smith' 905 issues a voice command 915 to switch the user to another talk group, namely 'commander' 950. The voice command 915 is processed, for example, via an electronic digital assistant (EDA) 920. The electronic digital assistant 920 identifies the intent of the voice command 915 and may send a request to the talk group server 140 to switch the user 'Smith' 905 from the talk group 'case 1112' 910 to the talk group 'Commander' 950. The electronic digital assistant 920 further provide an audio response 925 to indicate that the user is being switched to the talk group 'Commander' 950. When the talk group server 140 switches the user 'Smith' 905 to the talk group 'Commander' 950, the electronic digital assistant 920 in talk group 'Commander' 950 provides an audio communication 970 on the talk group channel to indicate that user 'Smith' has joined the talk group 'commander' 950.

When user 'Smith' 905 is switched to the talk group 'commander' 950, the talk group server 140 also creates a virtual talk group member i.e., 'Virtual Smith' 935 and causes the virtual talk group member 935 to join the talk group 'Case #1112' 910. Optionally, the electronic digital assistant 920 also transmits an audio communication 930 on the talk group channel of the talk group 'Case #1112' 910 to indicate that virtual 'Smith' has joined the talk group 'Case #1112' 910. The virtual 'Smith' 935 monitors and responds to conversations in the talk group 'case #1112' 910 while the original user 'Smith' 905 communicates with members 965 in the talk group 'commander' 950. The audio communications 975, 980, 985, 990 corresponds to communications between original user 'Smith' 905 and other members 965 of the talk group 'commander' 950.

In the example shown in FIG. 9, a talk group member 940 sends an audio inquiry 945 on the talk group 'case #1112' to check the status of the medical team. In response, 'Virtual Smith' 935 provides an audio response 955 on the talk group 'case #1112' 910 to inform that the medical team is arriving in 2 minutes. 'Virtual Smith' 935 may use historical conversations associated with original user 'Smith' 905 to extract information used to generate the audio response 955. The audio response 955 may include an audio tone (such as a 'beep') prior to and/or after transmitting message portion of the audio response 955. Virtual 'Smith' 935 may provide the audio response 955 using a voice profile that is generated based on voice characteristics of the original user 'Smith' 905.

In accordance with embodiments of the disclosure, system and method described herein can be advantageously employed in public safety environments to allow a virtual talk group member to perform an assignment on behalf of an original talk group user. The virtual talk group member ensures that a talk group member does not miss out important conversations in a talk group when the user switches to another talk group. Further, a virtual talk group member uses the user profile of the original talk group member when sending or receiving audio communications in the talk group. This allows other members of the talk group to intuitively know what information to provide when identity of a virtual talk group member is known, thereby improving the user experience of talk group members. The system and method described herein also provides seamless sharing of information between members of different groups as talk group users can continue to monitor and access high priority information as well as respond to conversations in talk groups via a virtual talk group member even if the talk group users are currently busy communicating in other talk groups or actively investigating an incident.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a talk group server to control a virtual talk group member, the method comprising:
   determining, at an electronic processor of the talk group server, an assignment for a virtual talk group member to join a first talk group and communicate on behalf of a talk group member associated with a second talk group to a plurality of talk group members on the first talk group;
   obtaining, at the electronic processor, user profile associated with the talk group member on the second talk group;
   causing, at the electronic processor, the virtual talk group member to join the first talk group using the user profile associated with the talk group member; and
   controlling, at the electronic processor, the virtual talk group member to perform the assignment by generating audio communications as a function of the user profile associated with the talk group member and transmitting the generated audio communications to the plurality of talk group members on the first talk group.

2. The method of claim 1, wherein prior to determining the assignment, the method further comprises at least one of:
   receiving an audio inquiry identifying the assignment for the virtual talk group member from a communication device of the talk group member; and
   receiving a request from the communication device of the talk group member to switch the talk group member from the first talk group to the second talk group.

3. The method of claim 2, wherein when the audio inquiry identifying the assignment is received, the method further comprising:
   processing the audio inquiry, via a natural language processing engine, to extract information related to:
   the talk group member for which the virtual talk group member is to be created,
   the assignment to be completed by the virtual talk group member, and
   the first talk group to which the virtual talk group member is to join to perform the assignment.

4. The method of claim 1, wherein the user profile of the talk group member comprises at least one of: identifier of the talk group member, talk group identifier of the second talk group with which the talk group member is currently associated, one or more voice characteristics of the talk group member, and a determined context corresponding to the talk group member.

5. The method of claim 4, wherein the determined context includes information identifying an incident associated with the talk group member, location of the talk group member, an agency to which the talk group member is affiliated, rank, experience, and role of the talk group member, historical talk group conversations associated with the talk group member, and knowledge data and sensor data corresponding to the talk group member.

6. The method of claim 4, further comprising:
   synthesizing voice of the talk group member using one or more voice characteristics of the talk group member; and controlling the virtual talk member to transmit the audio communications with the synthesized voice on the first talk group.

7. The method of claim 1, further comprising:
controlling the virtual talk group member to transmit an audio tone on the first talk group prior to or after transmitting the audio communications, the audio tone indicating to other talk group members on the first talk group that the virtual talk group member is communicating on behalf of the talk group member.

8. The method of claim 1, further comprising:
determining, at the electronic processor, that the assignment is completed;
causing, at the electronic processor, the virtual talk group member to switch from the first talk group to the second talk group with which the talk group member is associated; and
controlling, at the electronic processor, the virtual talk group member to
generate audio communications including information collected as a result of completion of the assignment based on the audio communications transmitted on the first talk group and further as a function of the user profile associated with the talk group member, and
transmit the generated audio communications including information collected as the result of the completion of the assignment on the second talk group associated with the talk group member or on at least one other talk group as indicated in the assignment.

9. The method of claim 1, further comprising:
determining, at the electronic processor, that the assignment is completed;
causing, at the electronic processor, the virtual talk group member to disassociate from the first talk group; and
controlling, at the electronic processor, the virtual talk group member to
generate audio output including information collected as a result of completion of the assignment based on the audio communications transmitted on the first talk group and further as a function of the user profile associated with the talk group member, and
play back the audio output at a communication device associated with the talk group member.

10. The method of claim 1, wherein controlling comprises:
determining that the assignment includes obtaining information related to a current incident assigned to the talk group member; and
controlling the virtual talk group member to transmit a query requesting information related to the current incident on the first talk group;
controlling the virtual talk group member to receive a response including information related to the current incident from one or more talk group members of the first talk group; and
sending the response including information related to the current incident to a communication device associated with the talk group member or on the first talk group associated with the talk group member.

11. The method of claim 1, wherein joining further comprises:
registering the virtual talk group member to the first talk group using an identifier of the talk group member; and
controlling the virtual talk group member to monitor audio communications on the first talk group while the talk group member is associated and actively communicating on the second talk group.

12. The method of claim 1, further comprising:
updating the virtual talk group member when the user profile of the talk group member changes.

13. A talk group server, comprising:
an electronic processor; and
a communication interface communicatively coupled to the electronic processor, wherein the electronic processor is configured to
determine an assignment for a virtual talk group member to join a first talk group and communicate on behalf of a talk group member associated with a second talk group to a plurality of talk group members on the first talk group,
obtain user profile associated with the talk group member on the second talk group,
cause the virtual talk group member to join the first talk group using the user profile associated with the talk group member, and
control the virtual talk group member to perform the assignment by generating audio communications as a function of the user profile associated with the talk group member and transmitting the generated audio communications to the plurality of talk group members on the first talk group.

14. The talk group server of claim 13, further comprising a transceiver configured to receive at least one of:
an audio inquiry identifying the assignment for the virtual talk group member from a communication device of the talk group member; and
a request from the communication device of the talk group member to switch the talk group member from the first talk group to the second talk group.

15. The talk group server of claim 14, wherein the electronic processor is further configured to process the audio inquiry, via a natural language processing engine, to extract information related to:
the talk group member for which the virtual talk group member is to be created,
the assignment to be completed by the virtual talk group member, and
the first talk group to which the virtual talk group member is to join to perform the assignment.

16. The talk group server of claim 13, further comprising a memory that stores the user profile, wherein the user profile comprises at least one of: identifier of the talk group member, talk group identifier of the second talk group with which the talk group member is currently associated, one or more voice characteristics of the talk group member, and a determined context corresponding to the talk group member.

17. The talk group server of claim 16, wherein the determined context includes information identifying an incident associated with the talk group member, location of the talk group member, an agency to which the talk group member is affiliated, rank, experience, and role of the talk group member, historical talk group conversations associated with the talk group member, and knowledge data and sensor data corresponding to the talk group member.

18. The talk group server of claim 16, wherein the electronic processor is further configured to:
synthesize voice of the talk group member using one or more voice characteristics of the talk group member; and
control the virtual talk member to transmit the audio communications with the synthesized voice on the first talk group.

19. The talk group server of claim 13, wherein the electronic processor is further configured to:
   determine that the assignment is completed;
   cause the virtual talk group member to switch from the first talk group to the second talk group with which the talk group member is associated; and
   control the virtual talk group member to
      generate audio communications including information collected as a result of completion of the assignment based on the audio communications transmitted on the first talk group and further as a function of the user profile associated with the talk group member, and
      transmit the generated audio communications including information collected as the result of the completion of the assignment on the second talk group associated with the talk group member or on at least one other talk group as indicated in the assignment.

20. The talk group server of claim 13, wherein the electronic processor is further configured to:
   determine that the assignment is completed;
   cause the virtual talk group member to disassociate from the first talk group; and
   control the virtual talk group member to
      generate audio output including information collected as a result of completion of the assignment based on the audio communications transmitted on the first talk group and further as a function of the user profile associated with the talk group member, and
      play back the audio output at a communication device associated with the talk group member.

* * * * *